(12) United States Patent
Yan

(10) Patent No.: US 11,162,831 B2
(45) Date of Patent: Nov. 2, 2021

(54) DEVICE FOR PACKAGING AND DISPENSING A PRODUCT, NOTABLY A PHARMACEUTICAL OR COSMETIC PRODUCT

(71) Applicant: Galderma Research and Development, Lausanne (CH)

(72) Inventor: Jian Yan, Kirkland (CA)

(73) Assignee: GALDERMA RESEARCH & DEVELOPMENT

( * ) Notice: Subject to any disclaimer, the term of this patent is extended or adjusted under 35 U.S.C. 154(b) by 0 days.

(21) Appl. No.: 16/622,973

(22) PCT Filed: May 23, 2018

(86) PCT No.: PCT/EP2018/063536
§ 371 (c)(1),
(2) Date: Dec. 16, 2019

(87) PCT Pub. No.: WO2018/233967
PCT Pub. Date: Dec. 27, 2018

(65) Prior Publication Data
US 2020/0103266 A1    Apr. 2, 2020

(30) Foreign Application Priority Data
Jun. 23, 2017    (FR) ..................................... 1755759

(51) Int. Cl.
*G01F 11/00*    (2006.01)
*G01F 11/02*    (2006.01)
*B65D 83/00*    (2006.01)

(52) U.S. Cl.
CPC ........ *G01F 11/024* (2013.01); *B65D 83/0038* (2013.01)

(58) Field of Classification Search
CPC .......................... G01F 11/024; B65D 83/0038
(Continued)

(56) References Cited

U.S. PATENT DOCUMENTS 1,303,845 A * 5/1919 Blair .................. B05B 11/3074
222/340
2,029,056 A * 1/1936 Carlson ............... A45D 34/041
401/208

(Continued)

FOREIGN PATENT DOCUMENTS

FR    2791329 A1    9/2000

OTHER PUBLICATIONS

Int'l Search Report and Written Opinion dated Aug. 1, 2018 in Int'l Application No. PCT/EP2018/063536, translation of ISR only.

*Primary Examiner* — Vishal Pancholi
(74) *Attorney, Agent, or Firm* — Ice Miller LLP

(57) ABSTRACT

The device for packaging and dispensing a product including a storage container (12) provided with at least one variable-volume compartment (22) containing the product, a pressurizing means (30) able to permanently pressurize the product contained in the compartment, and a dispensing head (14) having a mounting base (32) attached to the container. The dispensing head further includes a dispensing member (34) mounted inside the mounting base (32) with the ability to move in rotation, a piston (36) with the ability to move in translation inside the dispensing member (34) and able to delimit, inside the said member, opposing first and second metering chambers (60, 62), and at least first and second orifices (56, 58) formed on the dispensing member (34) and respectively able to be in direct fluidic communication with the first and second metering chambers (60, 62).

12 Claims, 10 Drawing Sheets

(58) Field of Classification Search
USPC .................. 222/438, 367–368, 135, 219
See application file for complete search history.

(56) References Cited

U.S. PATENT DOCUMENTS

| | | | | |
|---|---|---|---|---|
| 2,427,680 | A * | 9/1947 | Leonard | F16N 25/04 184/7.4 |
| 3,125,136 | A * | 3/1964 | Miller et al. | B65B 3/32 141/369 |
| 3,318,491 | A * | 5/1967 | Williamson | B65D 83/0409 222/363 |
| 3,353,723 | A * | 11/1967 | Wieleba | D21C 7/06 222/368 |
| 3,394,850 | A * | 7/1968 | Volkober | B65B 3/32 222/219 |
| 3,459,338 | A * | 8/1969 | Kay | A61D 7/00 222/219 |
| 3,487,304 | A * | 12/1969 | Kennedy | G01R 31/31917 324/73.1 |
| 4,058,240 | A * | 11/1977 | Becker | F16L 55/09 222/368 |
| 4,162,751 | A * | 7/1979 | Hetland | G01F 11/24 222/293 |
| 4,316,559 | A * | 2/1982 | McLemore | G01F 11/24 222/225 |
| 4,416,397 | A * | 11/1983 | Brown | A61J 7/0053 222/219 |
| 4,767,028 | A * | 8/1988 | Rohlfing | B01J 8/002 137/240 |
| 4,828,145 | A * | 5/1989 | Raufast | B65G 53/4633 222/1 |
| 4,991,742 | A * | 2/1991 | Chang | A61M 5/148 222/105 |
| 5,368,195 | A | 11/1994 | Pleet et al. | |
| 5,375,744 | A * | 12/1994 | Henderson | B65G 65/4881 222/306 |
| 5,547,110 | A * | 8/1996 | Keller | G01F 11/04 222/219 |
| 6,179,583 | B1 * | 1/2001 | Weston | A61M 5/16809 222/334 |
| 6,409,051 | B1 * | 6/2002 | Travis | G01F 11/04 222/218 |
| 7,648,298 | B2 * | 1/2010 | Gueret | A45D 34/041 401/211 |
| 7,731,063 | B2 * | 6/2010 | Rusch | G01F 11/24 222/306 |
| 8,167,175 | B2 * | 5/2012 | Jaouen | A45D 27/10 222/145.5 |
| 9,776,776 | B2 * | 10/2017 | Yamasaki | A47G 19/2266 |
| 2005/0121472 | A1 * | 6/2005 | Wessels | B65D 35/40 222/362 |
| 2005/0174881 | A1 | 8/2005 | Ki | |
| 2010/0287891 | A1 | 11/2010 | Lee et al. | |
| 2012/0292349 | A1 * | 11/2012 | Zarou | G01F 23/261 222/368 |
| 2016/0377067 | A1 * | 12/2016 | Saveliev | F04B 13/02 222/1 |

* cited by examiner

DEVICE FOR PACKAGING AND DISPENSING A PRODUCT, NOTABLY A PHARMACEUTICAL OR COSMETIC PRODUCT

CROSS-REFERENCE TO RELATED APPLICATIONS

This application is a Section 371 of International Application No. PCT/EP2018/063536, filed May 23, 2018, which was published in the French language on Dec. 27, 2018, under International Publication No. WO 2018/233967 A1, which claims priority under 35 U.S.C. § 119(b) to French Patent Application No. 1755759, filed Jun. 23, 2017, the disclosures of which are incorporated herein by reference in their entirety.

BACKGROUND OF THE INVENTION

The present invention relates to a device for packaging and dispensing a product.

The device is particularly suited to dispensing cosmetic, pharmaceutical and dermatological pharmaceutical products. Such products may be dispensed for example in the form of a milk, a cream, a gel, a paste, etc.

Products of the abovementioned type are commonly stored in a container made notably of thermoplastic material or glass. The storage container is equipped with a dispensing head that is movable with respect to the container so as to allow a metered quantity of product to be delivered.

In the field of pharmaceuticals or of cosmetics, widespread use is made of storage containers of the type that use a variable-volume compartment equipped with an airless metering pump, generally known as an "airless pump", supporting the product dispensing head.

The variable-volume compartment is generally delimited by a follower piston mounted in a leaktight manner inside the storage container. Actuation of the metering pump causes the product contained in the compartment of the container to be sucked up and expelled. As the product is dispensed, the follower piston rises inside the container under the effect of the depression that results from the reduction in the product volume.

Such devices are advantageous in that the product to be dispensed is packaged and stored in a manner isolated from air. However, such devices are incapable of ensuring perfect reproducibility of the metered quantities of product that are dispensed given the internal design of metering pumps.

BRIEF SUMMARY OF THE INVENTION

The present invention aims to remedy this drawback.

More particularly, the present invention aims to provide a device for packaging and dispensing a product that makes it possible to precisely dispense the same quantity of product upon each use.

The present invention also aims to provide a device that has a simple design, is economical and is easy to use.

The object of the invention is a device for packaging and dispensing a product, notably a pharmaceutical or cosmetic product, comprising a storage container provided with at least one variable-volume compartment containing said product, a pressurizing means that is able to permanently pressurize the product contained in said compartment, and a dispensing head comprising a mounting base fastened to the container.

The dispensing head also comprises a dispensing member mounted inside the mounting base in a rotatable manner, and a piston that is movable in translation inside the dispensing member and is able to delimit, inside said member, opposite first and second metering chambers.

The dispensing head also comprises at least one first orifice that is formed in the dispensing member and is able to be in direct fluidic communication with the first metering chamber. The dispensing head also comprises at least one second orifice that is formed in the dispensing member and is able to be in direct fluidic communication with the second metering chamber.

An "orifice that is able to be in direct fluidic communication with the metering chamber" is understood to mean that said orifice is not associated with a selective dispensing means of the pump or valve type for forcing the product to pass through said orifice.

According to a general feature of the dispensing head, the metering member is movable at least between a first position, in which said first orifice is in fluidic communication with the variable-volume compartment of the container and in which said second orifice is in fluidic communication with at least one outlet orifice of the dispensing head, and a second position, in which said second orifice is in fluidic communication with said variable-volume compartment and in which said first orifice is in fluidic communication with said outlet orifice.

With such a device, when one of the orifices of the dispensing member is in fluidic communication with the variable-volume compartment of the storage container, under the effect of the pressure exerted by the pressurizing means, the product contained in this compartment is forced through said orifice and pushed into the associated metering chamber that is in fluidic communication with this orifice.

The filling of this metering chamber with product causes the piston to move and consequently causes a reduction in the volume of the other metering chamber. The product contained in this other metering chamber is thus dispensed through the outlet orifice(s) of the dispensing head.

In other words, under the effect of the pressure exerted by the product initially contained in the variable-volume compartment of the container, the piston is able to move from a first position, in which the volume of the metering chamber in communication with this compartment is at a minimum and the volume of the other metering chamber is at a maximum, to a second position, in which the volume of said metering chamber is at a maximum and the volume of said other metering chamber is at a minimum. This movement of the piston causes the product to be dispensed. When the volume of one of the metering chambers increases, the volume of the other metering chamber decreases. The maximum volumes of the chambers are the same.

When one of the orifices of the metering member is put into communication with the variable-volume compartment of the container, the metering chamber in fluidic communication with this orifice is thus filled and the product contained in the other metering chamber is expelled.

The dispensing head therefore makes it possible to meter product precisely in a reproducible manner upon each use.

Preferably, the piston comprises means for adjusting the maximum volume of each of the first and second metering chambers before use. Thus, it is possible to adapt the quantity of product delivered depending on the desired metered quantity.

To this end, the piston may comprise for example a rod, on each end of which a piston head is fastened in an adjustable manner. The piston heads can thus be moved toward or away from one another depending on the desired volumes of the first and second metering chambers.

For example, each end of the rod may comprise a thread engaged with a thread of the associated piston head. Alternatively, however, it remains possible to provide other designs of the piston. The piston may for example be in the form of a cylindrical disk. In this case, the maximum volume of each metering chamber remains fixed.

The dispensing member may be rotatable about a geometric axis transverse to a longitudinal axis of the storage container. Said outlet orifice is advantageously formed in the mounting base.

Advantageously, said outlet orifice has an elongate cross section, the smallest dimension of which is smaller than the largest dimension of the section of the piston. This ensures the retention of the piston inside the dispensing member in a simple and economical manner.

Advantageously, the dispensing member comprises an actuating means that is accessible from the outside of the mounting base. The dispensing member may comprise means for identifying the position of the first and second orifices and/or be shaped to identify these positions.

In one particular embodiment, the mounting base is in the form of two articulated shells that cover the dispensing member and keep the latter in position.

Preferably, the pressurizing means is disposed inside an additional variable-volume compartment of the storage container. No means that is situated outside the storage container is used for this function.

The storage container advantageously comprises a partition wall that delimits, in a leaktight manner, the variable-volume compartment containing said product and the additional variable-volume compartment.

In one particular embodiment, the partition wall is in the form of a piston that is movable inside the storage container. The pressurizing means may comprise an elastically deformable mechanical member that exerts a permanent pushing force on the piston in the direction of the dispensing head. The mechanical member may for example be in the form of a helical spring, or may also comprise one or more stacked elastic spring washers, for example of the Belleville type. In this particular embodiment, said additional variable-volume compartment is at atmospheric pressure. Alternatively, the pressurizing means may comprise a pressurized gas.

In another embodiment, the partition wall is in the form of a pouch with deformable or flexible walls. In this case, the pressurizing means may comprise a pressurized gas introduced into the space that is situated between this pouch and the walls of the container and forms the additional variable-volume compartment.

Advantageously, the device according to the invention may be used to package and dispense a cosmetic, pharmaceutical or dermatological product, notably in the form of a cream, a gel, a milk or a paste.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

In the drawings.

DETAILED DESCRIPTION OF THE INVENTION

Figure 1:
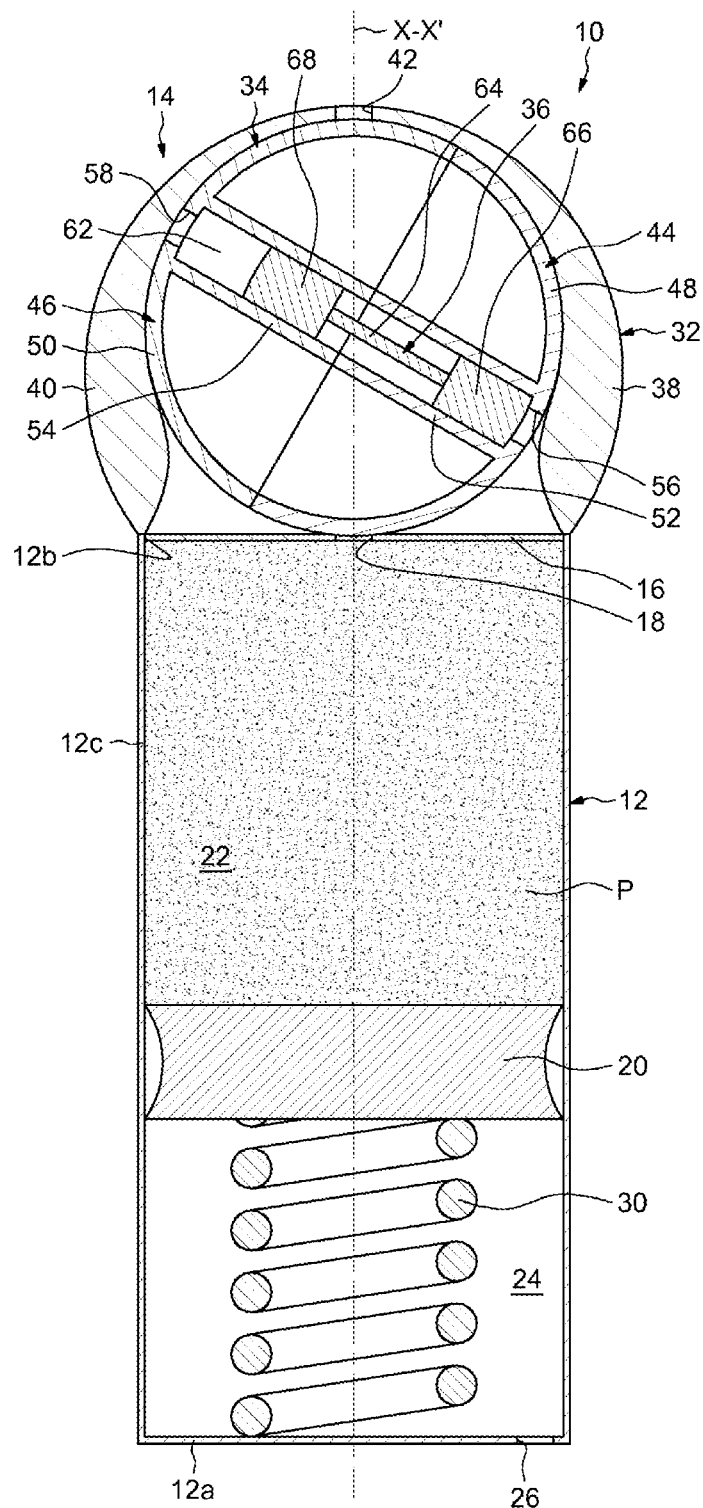
FIG. 1 is a sectional view of a packaging and dispensing device according to one exemplary embodiment of the invention.

FIG. 1 illustrates a device for packaging and dispensing a product, denoted by the overall reference numeral 10, which comprises a container 12 for storing said product P and a head 14 for dispensing said product, which is mounted on the container. The device 10 is shown in a position that is assumed to be vertical, with the dispensing head 14 disposed above the container 12.

As will be described in more detail below, the dispensing head 14 is designed so as to ensure precise and reproducible metering of the quantity of product P delivered upon each use.

The container 12 extends along a longitudinal, in this case vertical, axis X-X'. The container 12 comprises a lower end forming a bottom 12a, an open opposite end forming an access opening 12b, and a peripheral wall 12c extending axially between these ends. The peripheral wall 12c of the container can have for example a circular cross section or an oval section.

The container 12 also comprises an attached upper closing 16 wall that closes off the open access opening 12b of said container. The wall 16 can be fastened to the container by any appropriate means, for example by adhesive bonding, snap-fastening, etc. The wall 16 is provided with a through-orifice 18. The orifice 18 is in this case centered on the axis X-X'.

The container 12 comprises a pushing piston 20 that is mounted therein in a leaktight manner while being able to move freely in the axial direction. The piston 20 is in frictional contact with the peripheral wall 12c of the container. The piston 20 delimits, inside the container 12, a variable-volume compartment 22, which contains the product P. The compartment 22 is axially delimited by the piston 20 and by the wall 16 of the container. The orifice 18 forms an outlet orifice for the product P.

Axially on the opposite side from the compartment 22, the piston 20 delimits, on the inside of the container 12, an additional, likewise variable-volume compartment 24. The compartment 24 is at atmospheric pressure via the orifice 26 formed through the thickness of the bottom 12a of the container, which forms an air inlet orifice. The compartment 26 is axially delimited by the bottom 12a of the container and by the piston 20. The compartments 22, 24 are disposed axially on either side of the piston 20.

The container 12 and the piston 20 can each be produced in one piece, for example by molding a thermoplastic material, for example polypropylene (PP) or polyethylene (PE).

The device 10 also comprises a spring 30, which is mounted inside the compartment 24 and exerts a permanent pushing force on the piston 20, which tends to push it axially in the direction of the dispensing head 14. The spring 30 thus makes it possible to permanently pressurize the product P contained in the compartment 22 of the container.

The spring 30 is disposed axially between the piston 20 and the bottom 12a of the container. The spring 30 is compressed axially between the piston 20 and the bottom 12a. The spring 30 is centered on the axis X-X'. The spring 30 is in this case in the form of a helical compression spring. The lower end coil of the spring 30 bears against the bottom 12a of the container, while the upper end coil bears against the piston 20. In the exemplary embodiment illustrated, the spring 30 is in the form of a helical spring. Alternatively, in order to exert an axial force on the piston 20, it is possible to provide an elastic washer or a plurality of axially stacked elastic washers, for example of the Belleville type.

Figure 3:
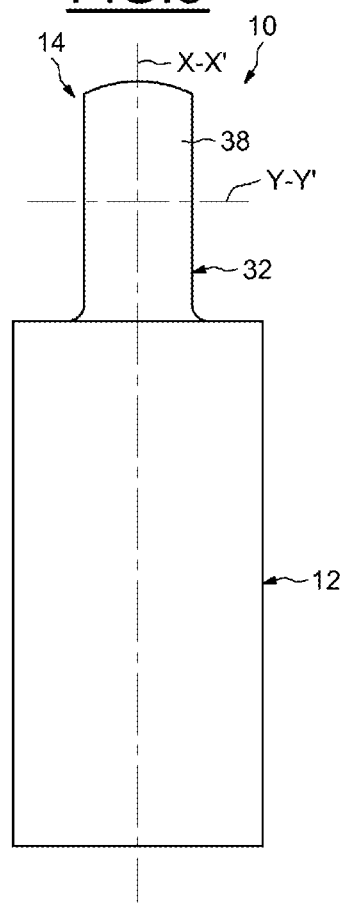
Figure 4:
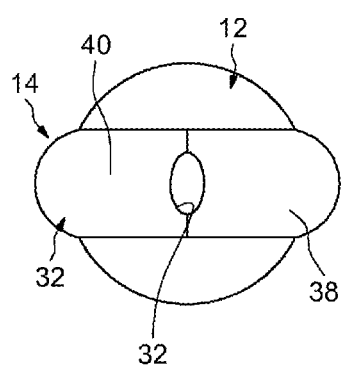

The dispensing head 14 comprises a mounting base 32 for mounting on the container 12 and a dispensing member 34 mounted inside said base so as to be rotatable about an axis Y-Y' (FIG. 3) transverse to the axis X-X' of the container. The dispensing head 14 also comprises a piston 36 that is movable in translation inside the dispensing member 34.

The base 32 performs a dual function, namely that of mounting the dispensing head 14 on the container 12 and of maintaining the axial position of the dispensing member 34 with respect to said container.

In the exemplary embodiment illustrated, the base 32 comprises two half-shells 38, 40 that are articulated, at an upper end, by a hinge (not shown) in order to make it possible to mount the dispensing member 34. The hinge may be for example of the film hinge type. The half-shells 38, 40 and the hinge are advantageously made in one piece by moulding a plastics material. The lower ends of the half-shells 38, 40 are fastened to the upper end of the container 12 by any appropriate means, for example by snap-fastening, adhesive bonding, a tight fit, etc. In the exemplary embodiment illustrated, the half shells 38, 40 have flat opposing faces. Alternatively, the half-shells 38, 40 can have a spherical shape.

The base 32 comprises an outlet through-orifice 42 formed through its thickness. The orifice 42 forms the outlet orifice of the dispensing head 14. The orifice 42 is formed in the half-shells 38, 40. In the exemplary embodiment illustrated, the orifice 42 is coaxial with the axis X-X'. In the exemplary embodiment illustrated, the orifice 42 has an elongate shape. Alternatively, it is possible to provide an orifice 42 that has some other shape, for example a circular or polygonal shape.

The dispensing member 34 is held axially between the base 32 and the container 12, more specifically the wall 16 thereof. The base 32 covers the dispensing member 34. In the exemplary embodiment illustrated, the dispensing member 34 is in the form of a roller that is rotatable about the axis Y-Y'. The dispensing member 34 is in this case formed from two mutually identical half-rollers 44, 46. Each half-roller 44, 46 comprises a body 48, 50 that bears against the base 32, and a tube 52, 54 that extends inward from the body. Each half-roller 44, 46 also comprises a through-orifice 56, 58 that is formed through the thickness of the body 48, 50 and opens into the tube 52, 54. The tubes 52, 54 are coaxial and the orifices 56, 58 are diametrically opposed.

The piston 36 of the dispensing head is mounted inside the tubes 52, 54 of the dispensing member 34. The piston 36 is mounted freely inside the dispensing member 34 in a leaktight manner. As will be described in more detail below, the piston 36 is able to delimit, inside the dispensing member 34, a first metering chamber 60 (FIG. 7) and an opposite second metering chamber 62 depending on its position inside said dispensing member.

In the exemplary embodiment illustrated, the piston 36 comprises a rod 64 and a piston head 66, 68 fastened at each end of said rod. Each head 66, 68 is fastened to the rod 64 in adjustable manner, for example by providing, at each end of the latter, a thread engaged with a thread formed in a bore of the associated head 66, 68. The piston heads 66, 68 are in this case mutually identical. The cross section of each piston head 66, 68 corresponds precisely to the internal section of the tubes 52, 54 of the dispensing member 34. The section of each piston head 66, 68 can be oval, square, etc. The section of each head 66, 68 is greater than the smallest dimension of the outlet orifice 42. The rod 64 and the heads 66, 68 can be produced by molding a thermoplastic material.

Figure 5:
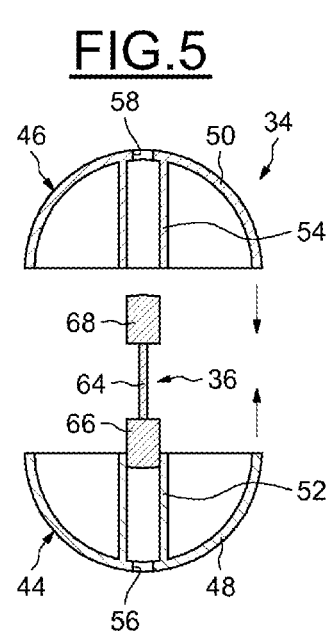
FIG. 5 is a sectional view illustrating the mounting of a piston inside a dispensing member of the device in FIG. 1, FIGS. 6 to 11 are sectional views of the device in FIG. 1 in various use positions.

FIG. 5 illustrates the mounting of the piston 36 inside the two half-rollers 44, 46 of the dispensing member.

Figure 7:
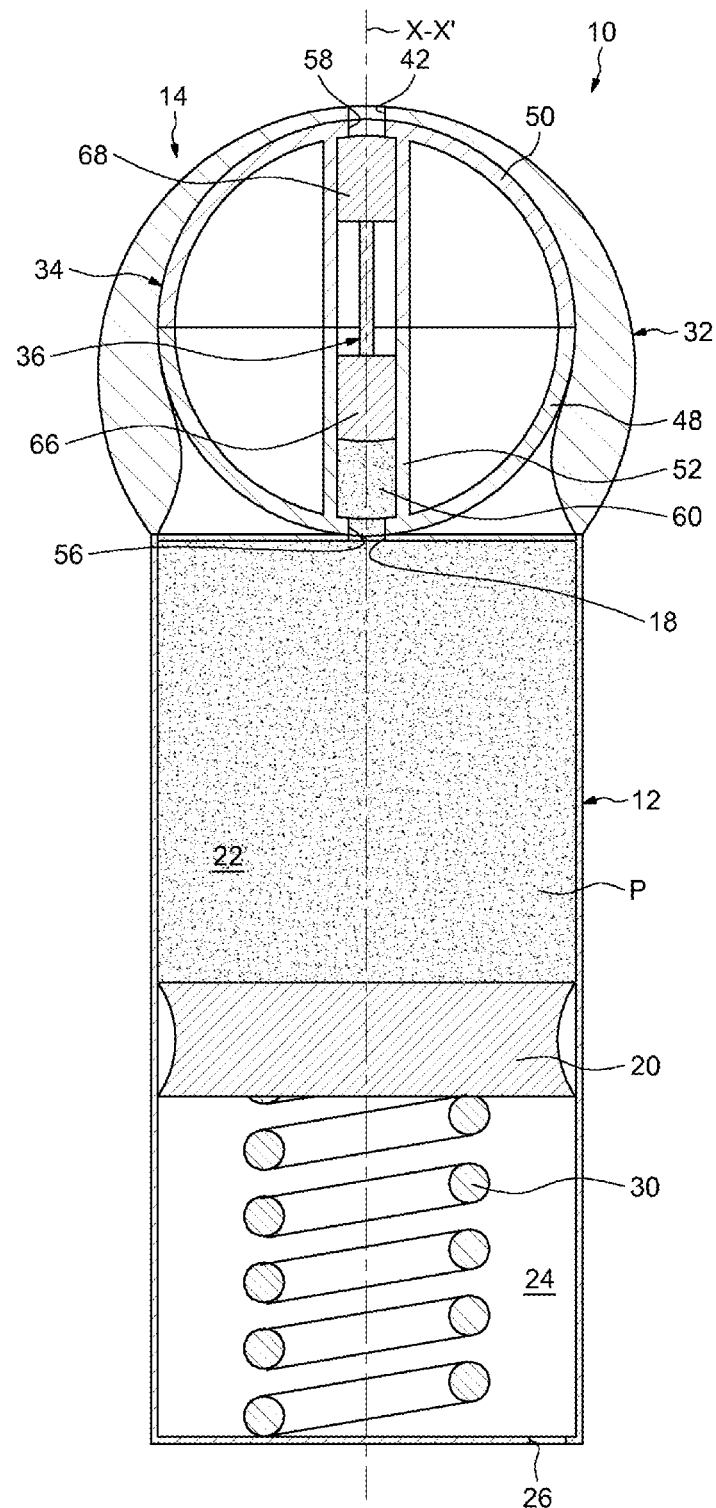

As can be seen in FIG. 7, the first metering chamber 60 is delimited by the piston head 66 and by the tube 52 of the dispensing member. The orifice 56 leads into the metering chamber 60. The orifice 56 is in direct fluidic communication with this chamber.

Referring again to FIG. 1, the second metering chamber 62 is delimited by the piston head 68 and by the tube 54 of the dispensing member. The orifice 58 leads into the metering chamber 62. The orifice 58 is in direct fluidic communication with this metering chamber 62.

Figure 2:
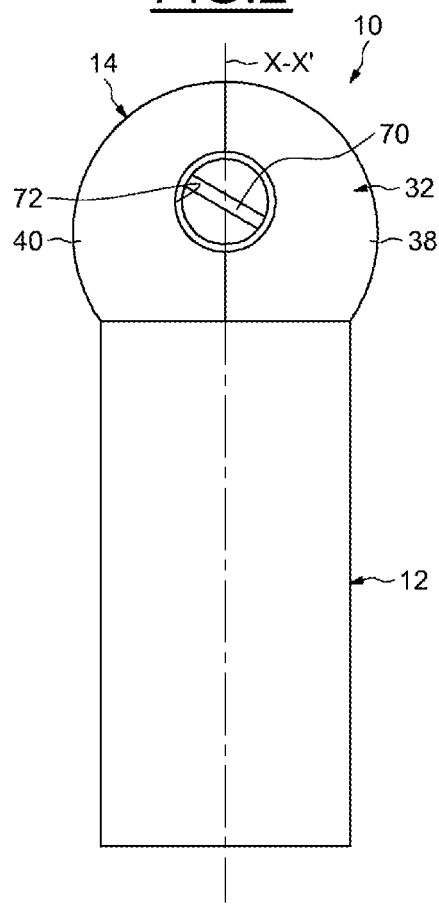
FIGS. 2 to 4 are front, side and top views, on a smaller scale, of the device in FIG. 1.

In order that the user can control the rotation of the dispensing member 34 from the outside, the latter has a grip 70 (FIG. 2), which extends laterally outward through an orifice 72 formed through the thickness of the base 32. The grip 70 is in the form of a disk portion having an elongate shape. The height of the grip 70 is such that its highest point is substantially flush with one of the flat faces of the base 32. Alternatively, other configurations of the grip 70 are possible.

In order to dispense the product P contained in the compartment 22 of the container, the user acts as follows.

Starting from the position illustrated in FIG. 1, which corresponds to a rest position of the dispensing head 14, the user pivots the dispensing member 34 so as to move the orifice 56 of said member next to the orifice 18 of the container, as is illustrated in FIG. 5. The orifice 56 is in direct fluidic communication with the compartment 22 of the container. In this position, the orifice 58 of the dispensing member is likewise next to the outlet orifice 42 of the dispensing head.

Advantageously, the grip 70 (FIG. 2) of the dispensing member 34 is oriented such that, in a vertical position, the orifices 56, 58 are respectively next to the orifices 18, 42. Alternatively or in combination, identifiers or marks can also be provided on the grip 70 so as to identify the position of the orifices 56, 58.

Figure 6:
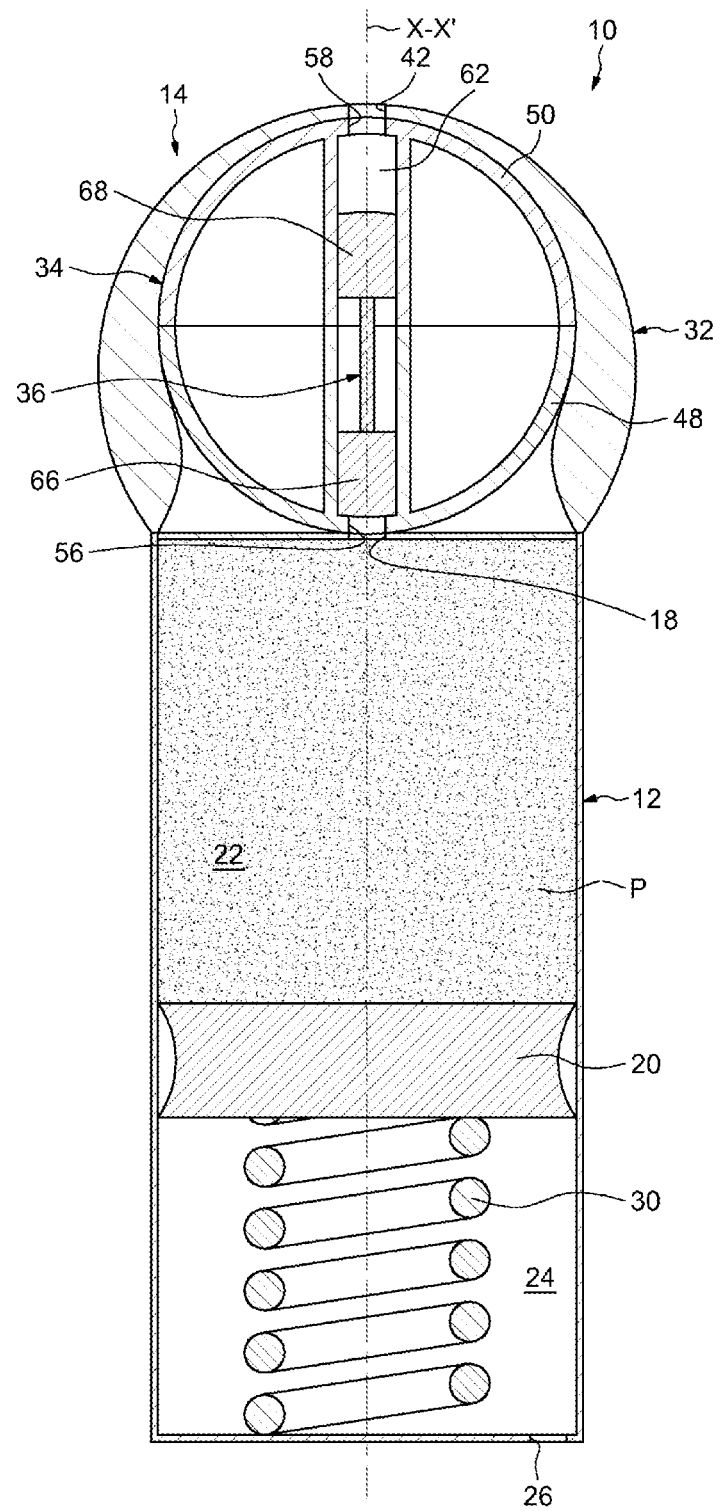

In the position illustrated in FIG. 6, the outlet orifice 18 of the container is no longer closed by the dispensing member 34. Under the effect of the permanent pushing force exerted by the spring 30, the piston 20 can then move axially in the direction of the dispensing head 14, as is illustrated in FIG. 7. For ease of understanding, the axial movement of the piston 20, which is illustrated in FIG. 7, has been exaggerated from its previous position, shown in FIG. 6.

With the movement of the piston 20, some of the product P present in the compartment 22 of the container is forced through the orifice 18 of the container and the orifice 56 of the dispensing member. This causes said product to push on the piston head 66 and the piston 36 to slide until the opposite head 68 butts against the body 50 of the dispensing member, as is illustrated in FIG. 7.

The movement of the piston 36 inside the dispensing member 34 under the pushing effect of the product P leads to the creation of the metering chamber 60, then the increase in the volume of this chamber and its simultaneous filling with product P until the head 68 of the piston butts against the dispensing member. At the same time as the increase in the volume of the metering chamber 60, there is a decrease in the volume of the metering chamber 62. In the position illustrated in FIG. 7, the piston head 68 closes the orifice 58 of the dispensing member. The volume of the metering chamber 62 is zero and the volume of the metering chamber 60 is at a maximum.

Figure 8:
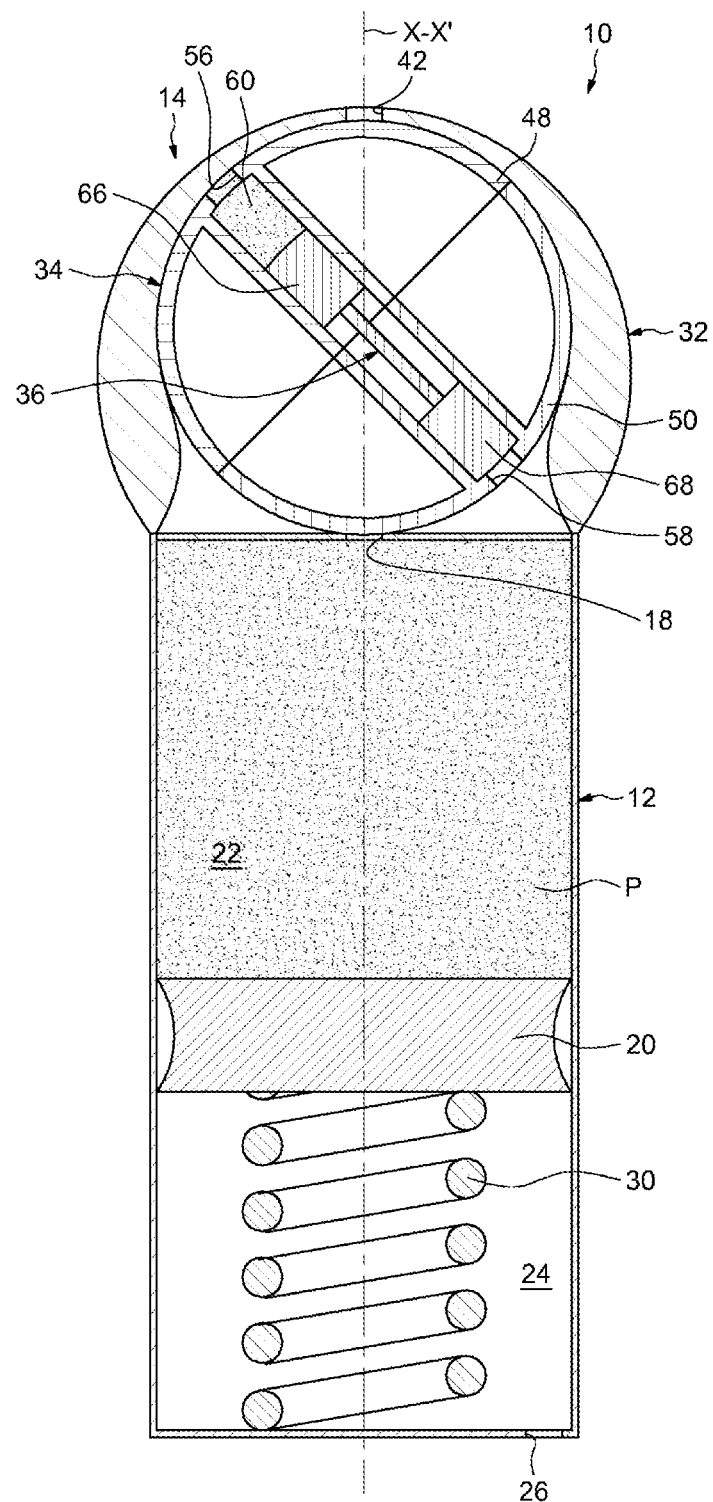
Figure 9:
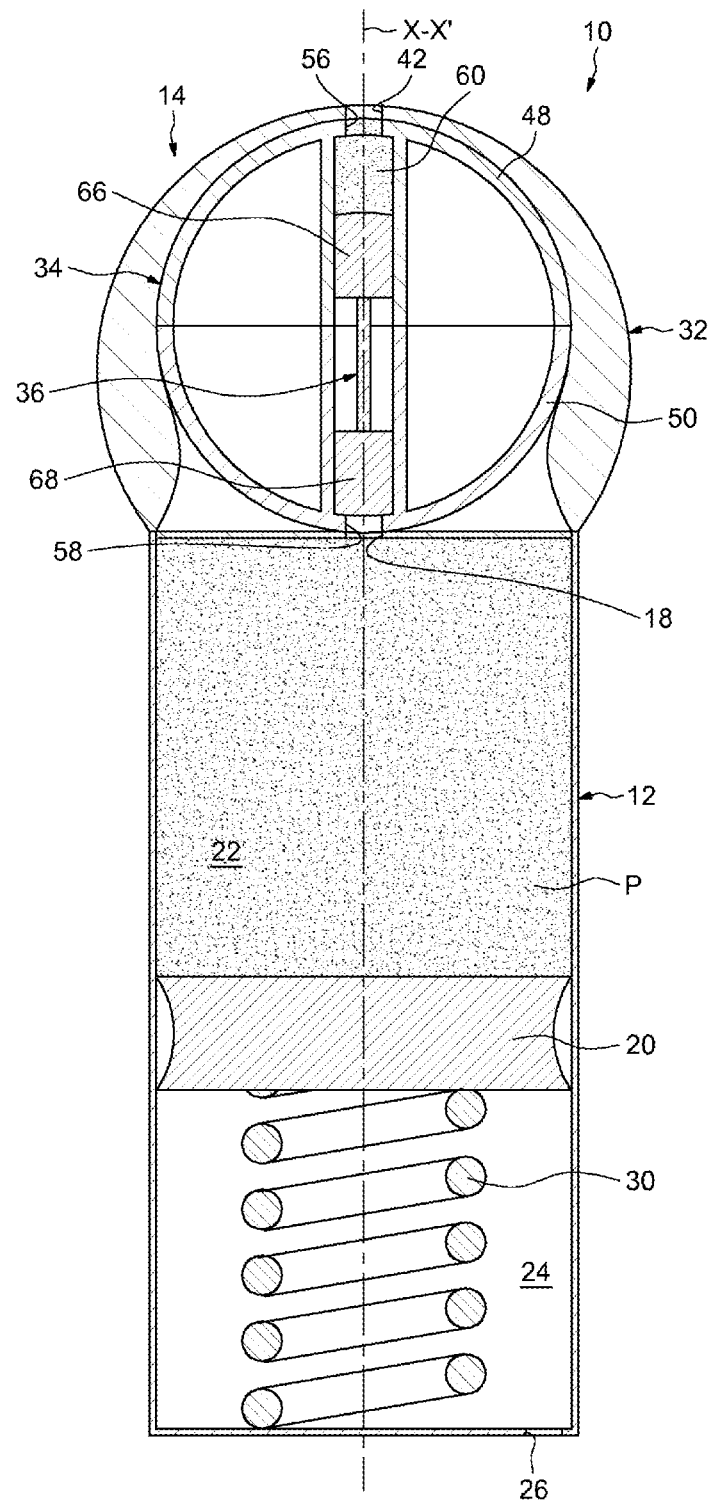

Starting from the position illustrated in FIG. 7, the user can pivot the dispensing member 34, as is illustrated in FIG. 8, so as to finally move the orifice 56 of said member next to the outlet orifice 42 of the dispensing head, as shown in FIG. 9. In this position, the orifice 58 of the dispensing member is for its part next to the orifice 18 of the container. The orifice 58 is in direct fluidic communication with the compartment 22 of the container via the orifice 18. During the movement of the dispensing member 34 from the position illustrated in FIG. 7 to the position illustrated in FIG. 9, the orifice 18 of the container is closed by said dispensing member.

Figure 10:
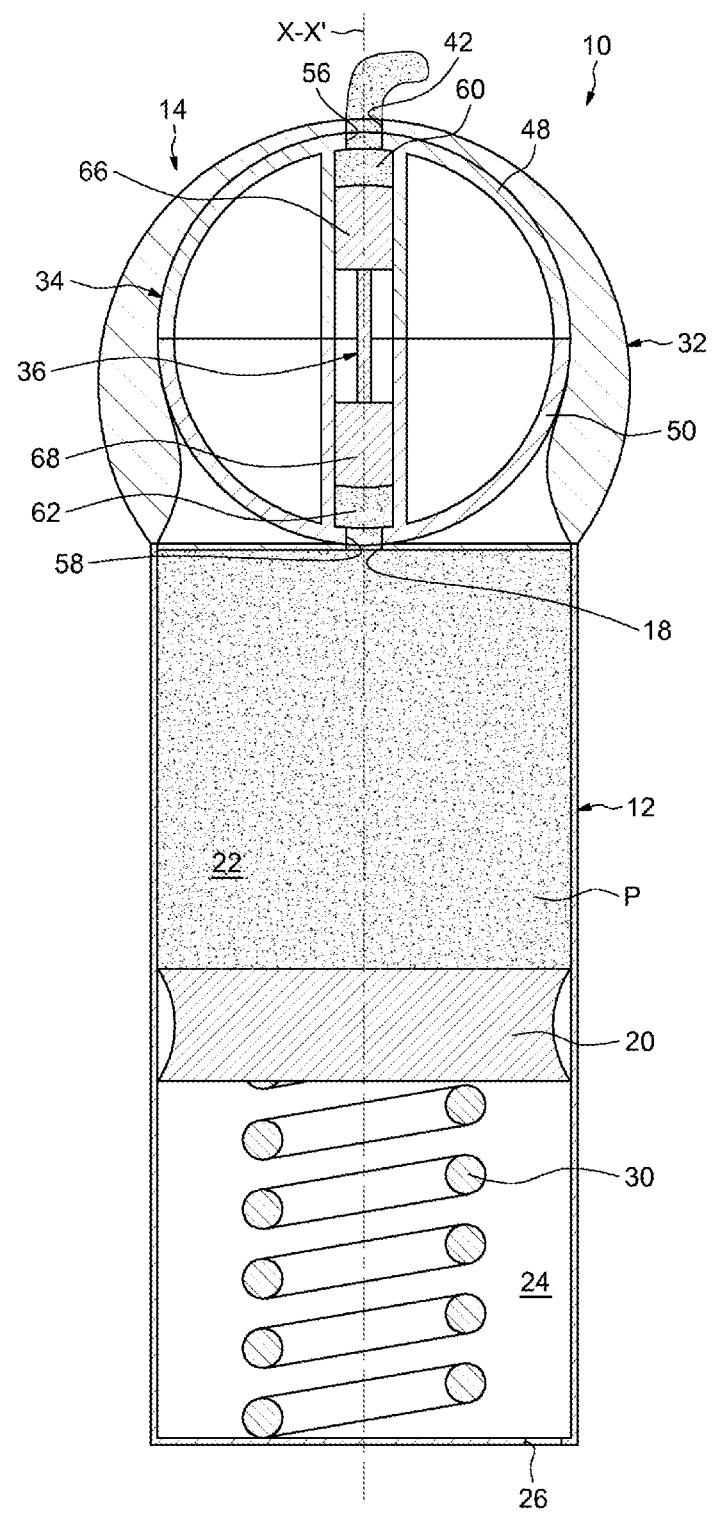

In the position illustrated in FIG. 9, under the effect of the force exerted by the spring 30, the piston 20 can then move axially in the direction of the head 14 and some of the product P present in the compartment 22 of the container is forced through the orifice 18 of the container and the orifice 58 of the dispensing member. This causes the piston 36 to move inside the dispensing member 34 in the direction of the outlet orifice 42 of the dispensing head, as is illustrated in FIG. 10.

Figure 11:
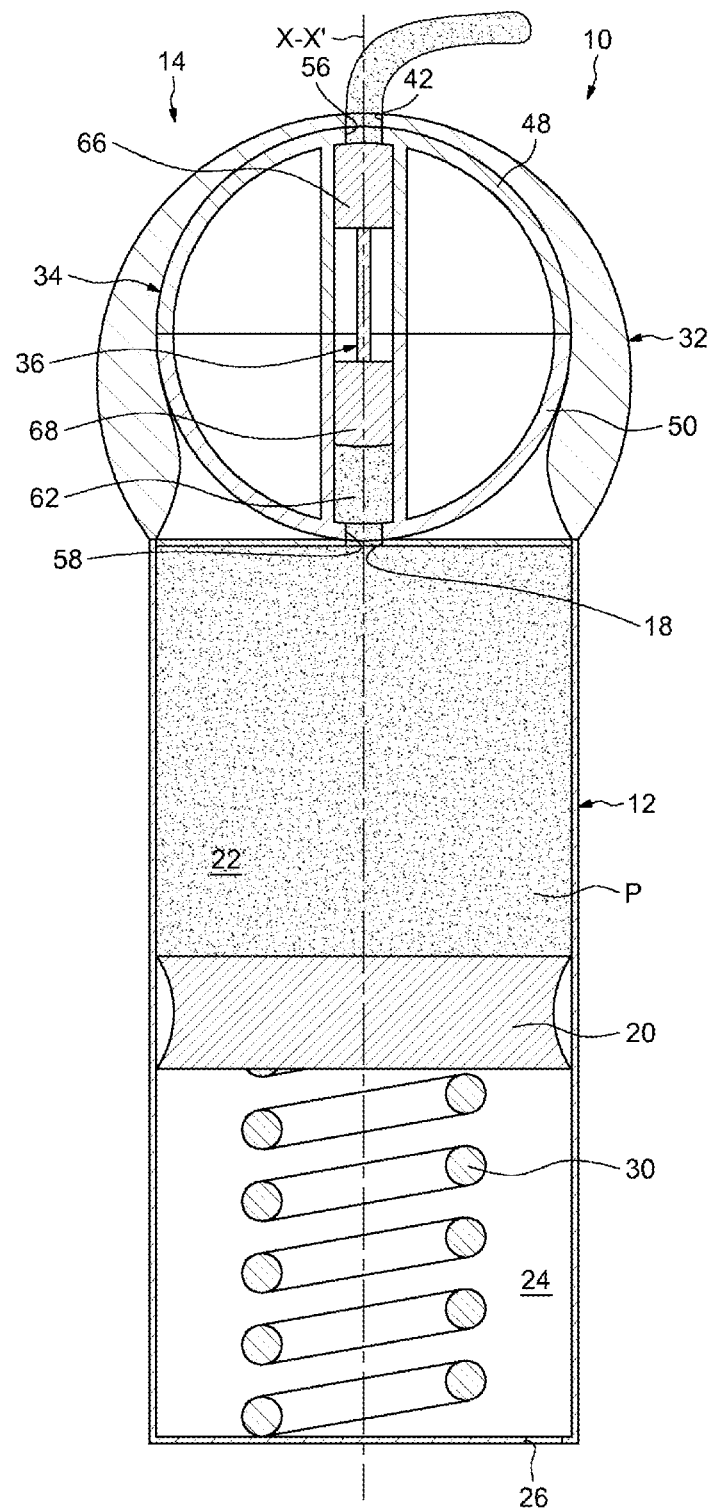

Thus, the metering chamber 62 is created once again and fills with product P coming from the compartment 22 of the container. At the same time, the volume of the opposite metering chamber 60 decreases and the product already present in this chamber is dispensed through the outlet orifice 42. The increase in volume of the metering chamber 62 and the filling thereof, and also the simultaneous dispensing of the product through the outlet orifice 42 continue until the piston head 66 butts against the body 48 of the dispensing member, as is illustrated in FIG. 11. The product is dispensed continuously while the metering chamber 60 empties.

With the device of the invention, the placing of the variable-volume compartment 22 of the container into communication with one of the orifices 56, 58 of the dispensing member causes the piston 36 to move, thereby making it possible to simultaneously obtain an ingress of the product P from the compartment 22 into the metering chamber 60, 62 in communication with this orifice, and dispensing of the product already present in the other metering chamber through the outlet orifice 42 of the dispensing head. Precise and reproducible metering of the quantity of product to be delivered upon each use of the device is thus obtained.

Figure 12:
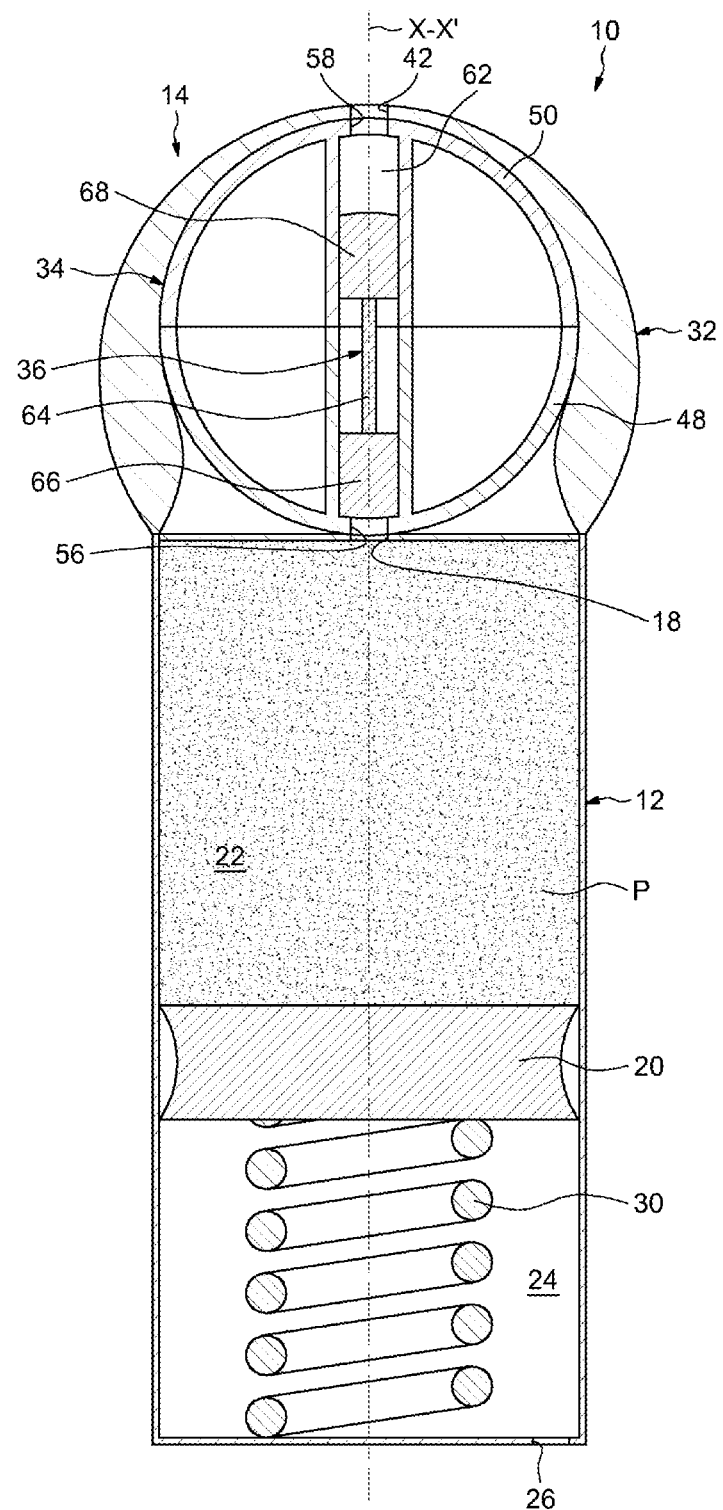
FIGS. 12 and 13 are sectional views of the device in FIG. 1 illustrating the possible modification of the metering of product.
Figure 13:
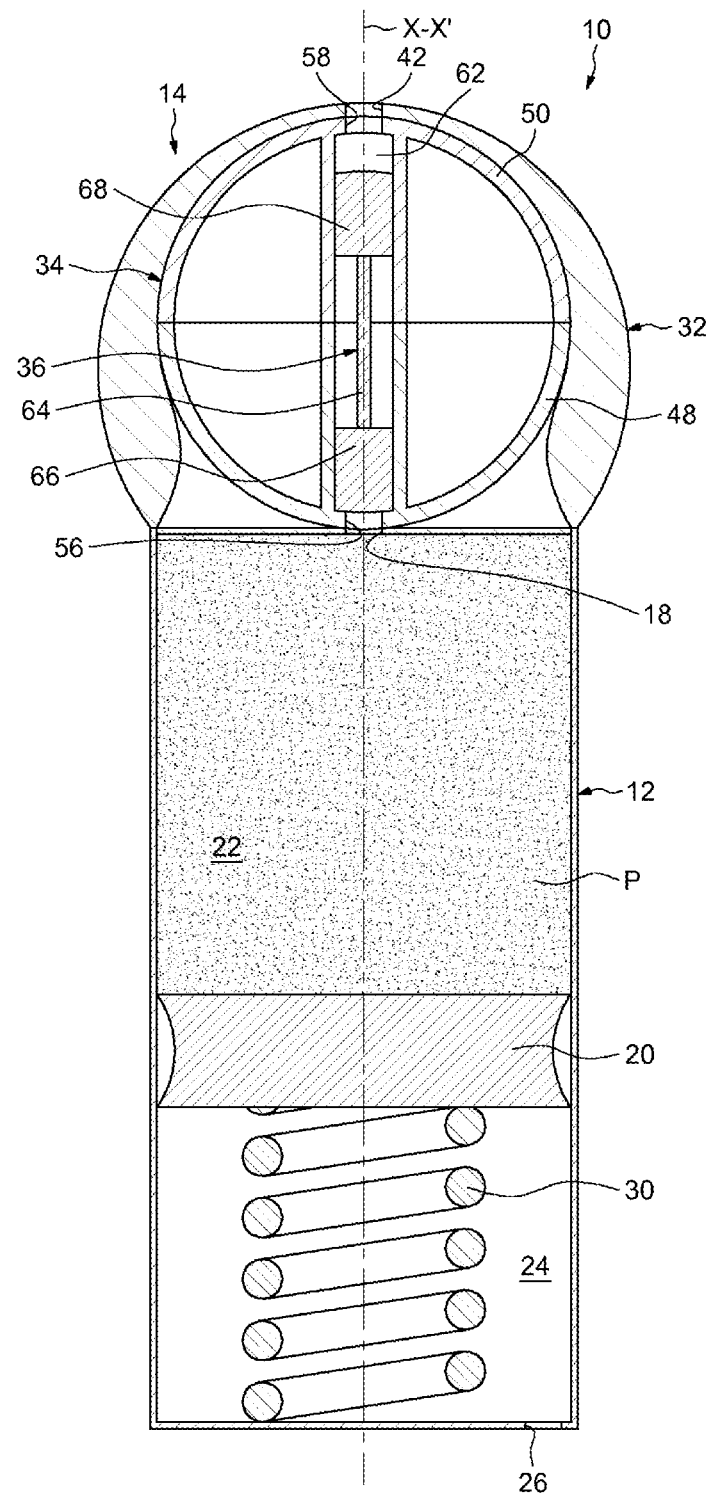

Furthermore, the quantity of product to be delivered can be modified. Specifically, as indicated above, each piston head 66, 68 is fastened in an adjustable manner to the rod 64, thereby making it possible to move the latter toward or away from one another depending on the volumes of the first and second metering chambers 60, 62 that are desired during the dispensing of the product. For example, with respect to the position illustrated in FIG. 12, the piston heads 66, 68 can be unscrewed, while remaining engaged with the rod 64, so as to reduce the volume of the metering chamber 62, as illustrated in FIG. 13.

The metering volume of the chambers 60, 62 can be modified during the assembly of the device depending on the product that is intended to be stored and dispensed. It is also possible to give the user the option to carry out this modification of the volume of the chambers 60, 62 for example with the aid of a key provided with the device and intended to be inserted into a housing of complementary shape formed on each frontal face of the piston heads 66, 68 in order to screw or unscrew these heads. This key is dimensioned to be able to be introduced through the orifices 42 and 56 or 58 so as to carry out this modification of the metering volume of the chambers 60, 62 from the outside of the device 10.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

The invention claimed is:

1. A device for packaging and dispensing a product, notably a pharmaceutical or cosmetic product, comprising a storage container provided with at least one variable-volume compartment containing said product, a pressurizing means that is able to permanently pressurize the product contained in said compartment, and a dispensing head comprising a mounting base fastened to the container, wherein the pressurizing means comprises a partition wall and an elastically deformable mechanical member that exerts a permanent pushing force on the partition wall in the direction of the dispensing head, characterized in that the dispensing head also comprises:
   a dispensing member mounted inside the mounting base in a rotatable manner,
   a piston comprising a rod, and a piston head fastened on each end of the rod in an adjustable manner, wherein the piston is movable in translation inside the dispensing member and is able to delimit, inside said member, opposite first and second metering chambers, and
   at least first and second orifices that are formed in the dispensing member and are respectively able to be in direct fluidic communication with the first and second metering chambers,
   the metering member being movable at least between a first position, in which said first orifice is in fluidic communication with the variable-volume compartment of the container and in which said second orifice is in fluidic communication with at least one outlet orifice of the dispensing head, and a second position, in which said second orifice is in fluidic communication with said variable-volume compartment and in which said first orifice is in fluidic communication with said outlet orifice.

2. The device as claimed in claim 1, wherein the piston comprises means for adjusting the maximum volume of each of the first and second metering chambers before use.

3. The device as claimed in claim 1, wherein each end of the rod comprises a thread engaged with a thread of the associated piston head.

4. The device according to claim 1, wherein the dispensing member is rotatable about a geometric axis transverse to a longitudinal axis of the storage container.

5. The device according to claim 1, wherein said outlet orifice is formed in the mounting base.

6. The device according to claim 1, wherein said outlet orifice has an elongate cross section, the smallest dimension of which is smaller than the largest dimension of the section of the piston.

7. The device according to claim 1, wherein the dispensing member comprises an actuating means that is accessible from the outside of the mounting base.

8. The device according to claim 1, wherein the dispensing member comprises means for identifying the position of the first and second orifices.

9. The device according to claim 1, wherein the mounting base is in the form of two articulated shells that cover the dispensing member and keep the latter in position.

10. The device according to claim 1, wherein the pressurizing means is disposed inside an additional variable-volume compartment of the storage container.

11. The device as claimed in claim 1, wherein the partition wall is in the form of a piston that is movable inside the storage container.

12. The device as claimed in claim 1, wherein the partition wall is in the form of a pouch with flexible walls.

* * * * *